(12) United States Patent
Hanano

(10) Patent No.: US 11,516,353 B2
(45) Date of Patent: Nov. 29, 2022

(54) SYSTEM TO DOWNLOAD A SCANNED FILE FROM A SERVER USING A DISPLAYED ACCESS CODE

(71) Applicant: Canon Kabushiki Kaisha, Tokyo (JP)

(72) Inventor: Hideki Hanano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/467,684

(22) Filed: Sep. 7, 2021

(65) Prior Publication Data

US 2022/0078293 A1     Mar. 10, 2022

(30) Foreign Application Priority Data

Sep. 8, 2020 (JP) .............................. JP2020-150737

(51) Int. Cl.
*H04N 1/00*        (2006.01)
*H04N 1/44*        (2006.01)

(52) U.S. Cl.
CPC ..... *H04N 1/00244* (2013.01); *H04N 1/00222* (2013.01); *H04N 1/00334* (2013.01); *H04N 1/4406* (2013.01)

(58) Field of Classification Search
None
See application file for complete search history.

(56) References Cited

U.S. PATENT DOCUMENTS

| | | | | |
|---|---|---|---|---|
| 2012/0050802 A1* | 3/2012 | Masuda | ............. | H04N 1/32133 |
| | | | | 358/1.15 |
| 2013/0083362 A1* | 4/2013 | Tanaka | ............... | H04N 1/00244 |
| | | | | 358/1.16 |
| 2016/0373462 A1* | 12/2016 | Wang | ...................... | H04L 65/61 |
| 2017/0094101 A1* | 3/2017 | Saito | .................. | H04N 1/00307 |
| 2017/0199711 A1* | 7/2017 | Kim | .................... | H04N 1/00307 |
| 2020/0285432 A1* | 9/2020 | Mino | ..................... | G06F 3/1222 |
| 2021/0211548 A1* | 7/2021 | Kobayashi | ......... | H04N 1/00464 |
| 2021/0211553 A1* | 7/2021 | Kobayashi | ......... | H04N 1/00244 |

FOREIGN PATENT DOCUMENTS

JP        6339167 B2 *   6/2018
JP        6339167 B2     6/2018

* cited by examiner

*Primary Examiner* — Henok Shiferaw
(74) *Attorney, Agent, or Firm* — Venable LLP

(57) ABSTRACT

A reading apparatus comprises: an upload unit that uploads to a server a scanned file; and a display control unit that obtains an access code which is generated and for accessing an upload destination of the scanned file and displays the generated access code on a display unit. A portable terminal comprises: a reading unit that reads the displayed access code; an access unit that obtains information indicating an upload destination of the scanned file based on the reading and, using the obtained information, accesses the upload destination; and a download unit that downloads the scanned file from the upload destination. The information indicating the upload destination of the scanned file includes authentication information related to an access of the upload destination of the scanned file.

20 Claims, 13 Drawing Sheets

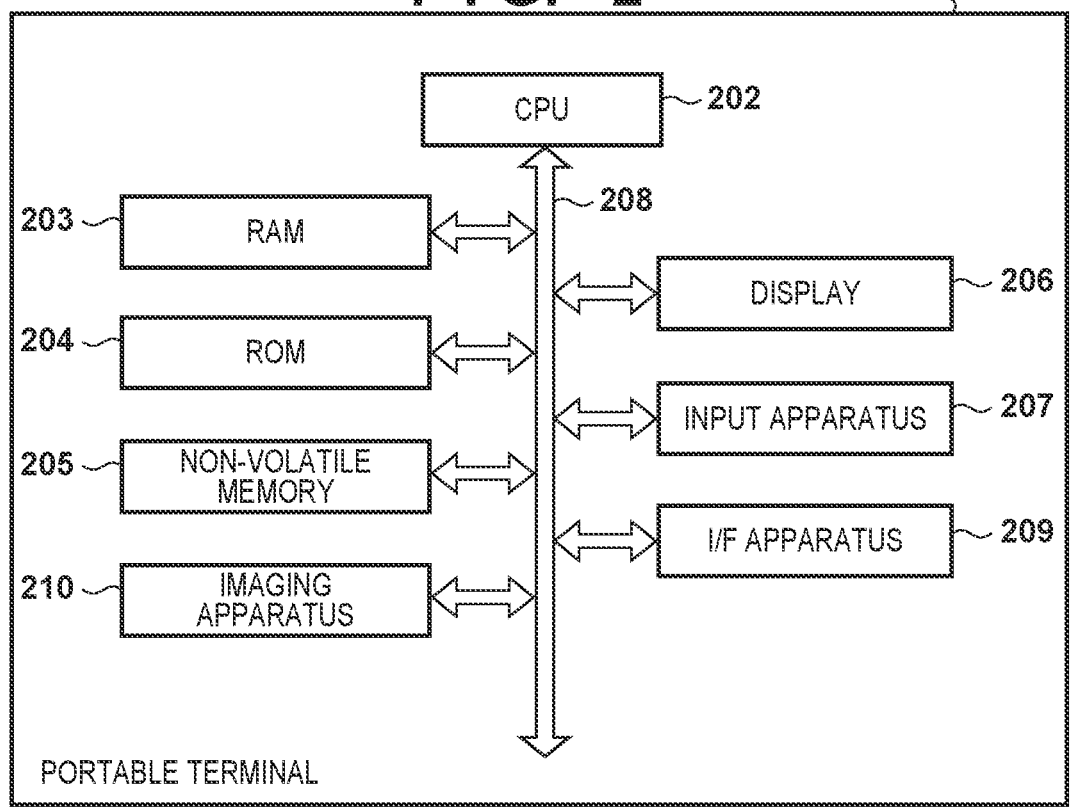
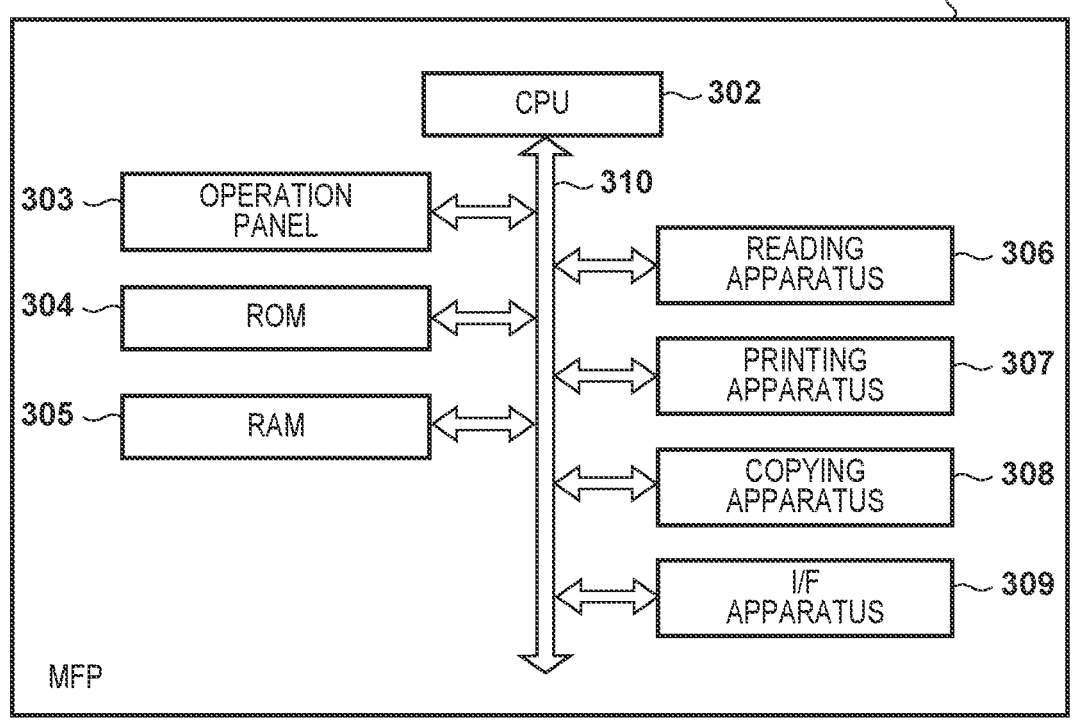

FIG. 10 https://storage.com/Device/SerialNumber/ScanJobID/scan.jpg?accessKey=xxxx&Expires=600

FIG. 11

| FILE SIZE (MB) | NUMBER OF FILES | COMMUNICATION LINE SPEED | VALIDITY PERIOD (SEC) |
|---|---|---|---|
| 10 | 1 | High | 600 |
| 100 | 1 | High | 900 |
| 100 | 1 | Low | 1200 |
| | | | |

FIG. 12

| ID | SHORTENED URL | SIGNED URL | |
|---|---|---|---|
| 001 | https://storage.com/AbCd1234 | https://storage.com/dev5500/serial1234/scan0001/scan.jpg?accessKey=xxxx&Expires=600 | 1201 |
| 002 | https://storage.com/wXyZ0369 | https://storage.com/dev3300/serial5678/scan0020/scan.jpg?accessKey=xxxx&Expires=600 | 1202 |
| 003 | https://storage.com/HiJk6789 | https://storage.com/dev2200/serial0246/scan0300?accessKey=xxxx&Expires=900 | 1203 |
| | | | |

1200

SYSTEM TO DOWNLOAD A SCANNED FILE FROM A SERVER USING A DISPLAYED ACCESS CODE

BACKGROUND OF THE INVENTION

Field of the Invention

The present invention relates to a system for obtaining a scanned file, and a server, and a reading apparatus.

DESCRIPTION OF THE RELATED ART

There are systems for obtaining and storing a file in which an original has been scanned by a multi function peripheral (MFP) in an information terminal such as a smartphone. In such systems, a dedicated application installed in an information terminal directly communicates with and controls the MFP to obtain scanned files. In addition, in the system, a file scanned by an MFP may be attached to an e-mail and transmitted to one's own information terminal. In order to eliminate the need for an input operation for setting an e-mail address in an MFP, Japanese Patent No. 6339167 describes a configuration in which a file is transmitted to an information terminal using access information printed by an MFP.

SUMMARY OF THE INVENTION

The present invention provides a system for realizing a system for securely obtaining scanned files with a simple configuration, a server, and a reading apparatus.

The present invention in one aspect provides a system including a reading apparatus operable to read an original image, a server, and a portable terminal, the reading apparatus comprising: an upload unit configured to upload to the server a scanned file obtained by scanning an original image; and a display control unit configured to obtain an access code which is for accessing an upload destination of the scanned file and is generated by a generation unit and to display the generated access code on a display unit; the portable terminal comprising: a reading unit configured to read the access code displayed on the display unit; an access unit configured to obtain information indicating an upload destination of the scanned file based on the reading by the reading unit and, using the obtained information, access the upload destination of the scanned file; and a download unit configured to download the scanned file from the upload destination of the scanned file accessed by the access unit, wherein the information indicating the upload destination of the scanned file includes authentication information related to an access of the upload destination of the scanned file.

According to the present invention, a system for securely obtaining a scanned file can be realized with a simple configuration.

Further features of the present invention will become apparent from the following description of exemplary embodiments with reference to the attached drawings.

BRIEF DESCRIPTION OF THE DRAWINGS

FIG. 2 is a diagram illustrating a hardware configuration of a portable terminal.

FIG. 3 is a diagram illustrating a hardware configuration of an MFP.

FIG. 10 is a diagram illustrating a signed URL.

FIG. 11 is a diagram illustrating a validity period management table.

FIG. 12 is a diagram illustrating a shortened URL management table.

DESCRIPTION OF THE EMBODIMENTS

Figure 1:
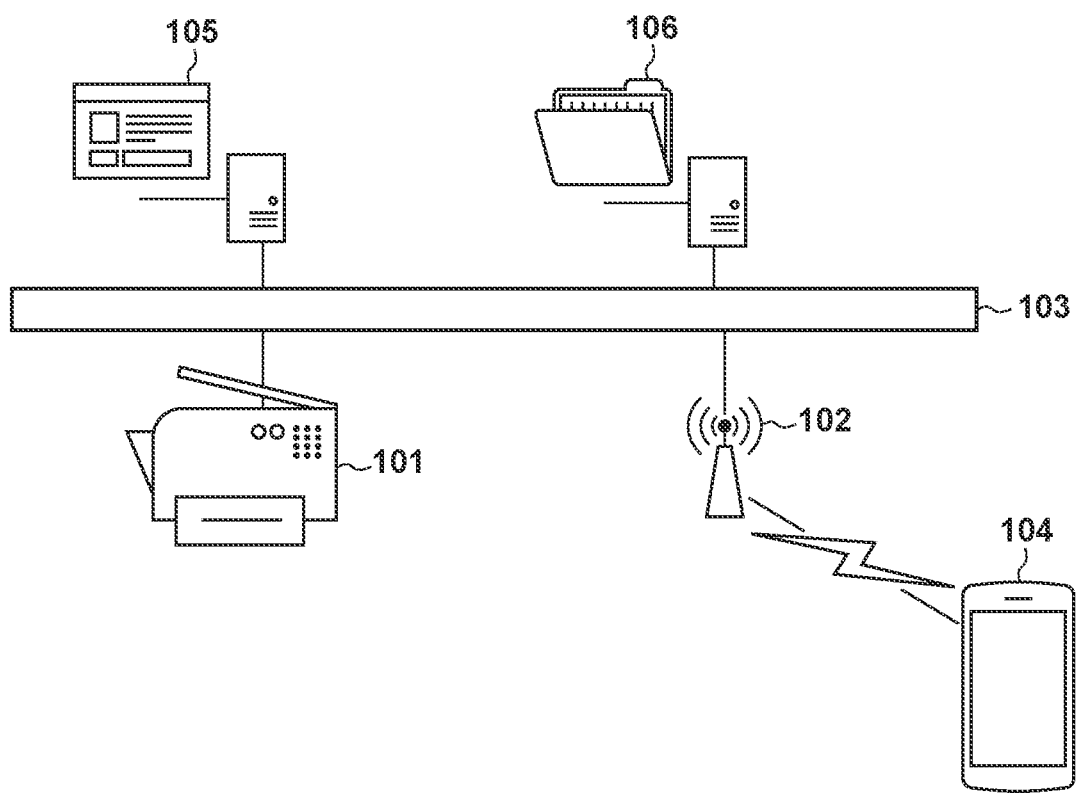
FIG. 1 is a diagram illustrating a configuration of a system for obtaining a scanned file.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

However, in order to start a dedicated application installed on the information terminal to obtain the scanned file, a dedicated application needs to be installed and a setup for directly communicating with the MFP is required. Further, there is a high possibility that the access information printed out as in Japanese Patent No. 6339167 may be obtained by a third party.

According to one aspect of the present invention, a system for securely obtaining a scanned file can be realized with a simple configuration.

First Embodiment

FIG. 1 is a diagram illustrating an example of a configuration of a system for obtaining a scanned file in the present embodiment. As illustrated in FIG. 1, an MFP (Multi Functional Peripheral) 101, a wireless LAN router 102, a management server 105, and a storage server 106 are connected to the Internet 103. The MFP 101 is an image forming apparatus including a scanning function, and generates a scanned file by optically reading an original image placed on a document table or ADF (Automatic Document Feeder) (not shown). A portable terminal 104 is, for example, an information terminal such as a smartphone, is wirelessly connected to the wireless LAN router 102, and can communicate with the Internet 103. Incidentally, the portable terminal 104 may be configured to be connected to the Internet 103 via a public line. The portable terminal 104 does not need to be in a state in which it can directly communicate with the MFP 101. The Internet 103 may also be another form of network, such as a WAN or LAN. In the present embodiment, a user of the portable terminal 104 can obtain a scanned file scanned by the MFP 101 and uploaded to the storage server 106 and store it in the portable terminal 104.

FIG. 2 is a diagram illustrating an example of a hardware configuration of the portable terminal 104. A CPU 202 comprehensively controls the portable terminal 104 by performing operation, determination, and control on data and instructions in accordance with software stored in a RAM 203, a ROM 204 or a non-volatile memory 205. The RAM 203 is used as a temporary storage area when the CPU 202 performs various processes. The non-volatile memory 205 stores an operating system (OS), application software, and the like.

A display 206 is configured to include a liquid crystal display and a graphic controller, and displays objects, such as images and icons represented by a shortcut menu and a launcher, a GUI, and the like. An input apparatus 207 is an apparatus for accepting various instruction operations for the portable terminal 104 from the user. For example, the input apparatus 207 is configured as a touch panel or a digital camera integrated with the display 206, but may be configured as a device separate from the display 206, such as a mouse or a keyboard.

Data is transmitted and received between the blocks illustrated in FIG. 2 via a system bus 208. The interface (I/F) apparatus 209 transmit and receives data to and from devices on the same network or the Internet using a protocol such as a TCP/IP via a wireless LAN or a wired LAN that is compatible with a standard such as IEEE 80211a. An imaging apparatus 210 is a camera for capturing an object using an image sensor such as a CCD (Charge Coupled Device). For example, the portable terminal 104 can extract an access code from read data obtained by reading a bar code by the imaging apparatus 210.

Figure 13:
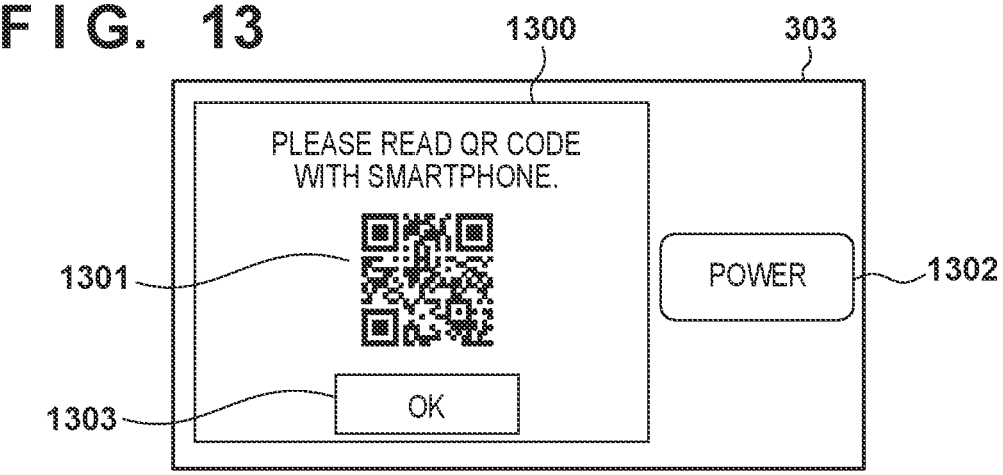
FIG. 13 is a diagram illustrating a state in which a QR code is displayed.

FIG. 3 is a diagram illustrating an example of a hardware configuration of the MFP 101. The MFP 101 includes an operation panel 303, a ROM 304, a RAM 305, a reading apparatus 306, a printing apparatus 307, a copying apparatus 308, an I/F apparatus 309, and a system bus 310. A CPU 302 comprehensively controls the MFP 101 by executing a program stored in the ROM 304 on the RAM 305 in accordance with a user's instruction received via the operation panel 303, for example. The ROM 304 stores MIT 101 control command programs and the like. The RAM 305 operates as a working memory of the CPU 302 and is also used as a storage area of a spooler of a print job. The operation panel 303 is configured to include keys and a touch pad for the user to operate, and a display unit for displaying images and various information to the user. FIG. 13 illustrates an example of the configuration of the operation panel 303, and the operation panel 303 includes a display 1300 and a power button 1302.

The reading apparatus 306 includes an optical sensor for optically reading an original image placed on a document table or ADF (not shown), and stores image data (scanned file) generated by reading by the optical sensor in the RAM 305. The printing apparatus 307 includes, for example, an ink tank for storing ink, and a printhead for ejecting ink droplets. The printing apparatus 307 includes a conveyance unit or the like for conveying printing paper, and performs recording of an image onto a recording medium such as the conveyed printing paper, for example. The printing apparatus 307 is not limited to the inkjet recording method, and an electrophotographic method, for example, may be adopted as another recording method. The copying apparatus 308 performs image processing for printing (i.e., a copy function) an original image to be read by the reading apparatus 306 using the printing apparatus 307.

Data is transmitted and received between the blocks illustrated in FIG. 3 via the system bus 310. The I/F apparatus 309 transmit and receives data to and from devices on the same network or the Internet using a protocol such as a TCP/IP via a wireless LAN or a wired LAN that is compatible with a standard such as IEEE 80211a.

Figure 4:
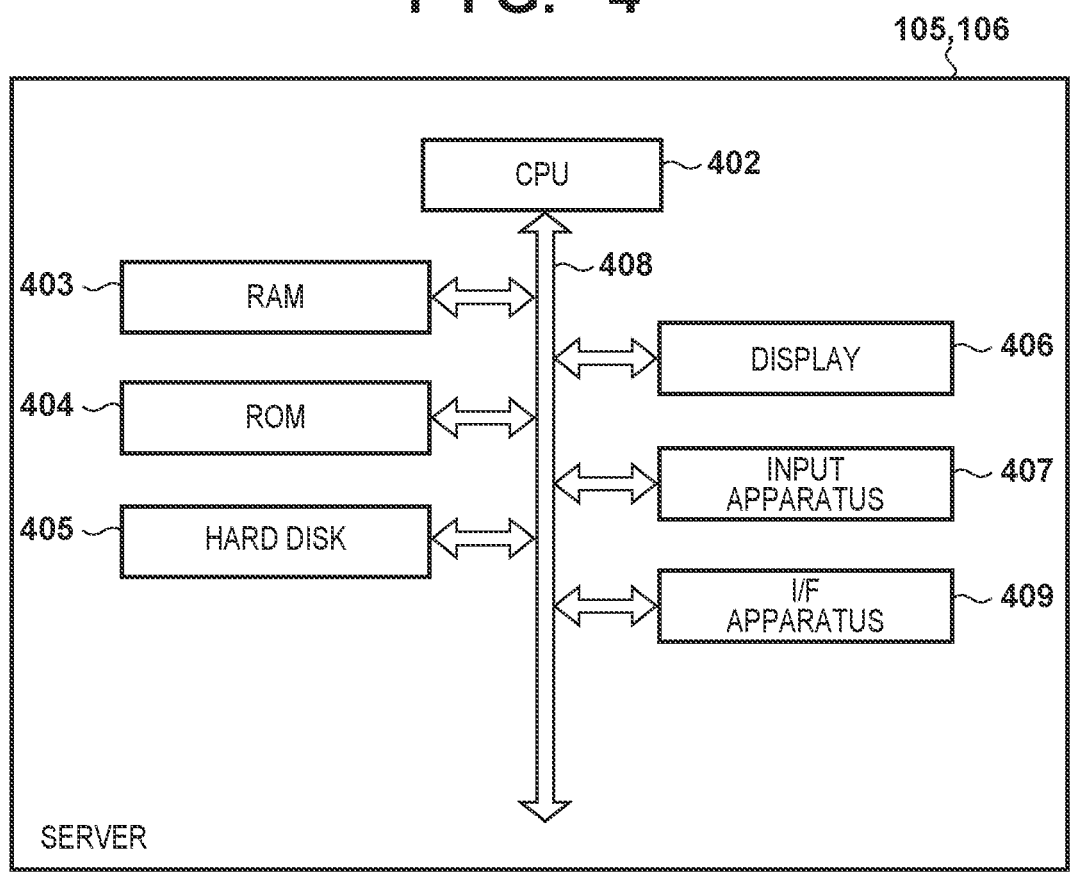
FIG. 4 is a diagram illustrating a configuration of a management server and a storage server.

FIG. 4 is a diagram illustrating an example of a configuration of the management server 105 and the storage server 106. The management server 105 and the storage server 106 have a common configuration, and hereinafter, the management server 105 will be described as a representative example of the management server 105 and the storage server 106 unless otherwise specified. A CPU 402 comprehensively controls the management server 105 by performing operation, determination, and control on data and instructions in accordance with software stored in a RAM 403, a ROM 404 or a hard disk 405. The RAM 403 is used as a temporary storage area when the CPU 402 performs various processes. The hard disk 405 stores an operating system (OS), application software, and the like.

A display 406 is configured to include a liquid crystal display and a graphic controller, and displays objects, such as images and icons represented by a shortcut menu and a launcher, a GUI, and the like. An input apparatus 407 is an apparatus for accepting various instruction operations for the management server 105 from the user. For example, the input apparatus 407 is configured as a touch panel integrated with the display 406, but may be configured as a device separate from the display 406, such as a mouse or a keyboard.

Data is transmitted and received between the blocks in FIG. 4 via a system bus 408. An I/F apparatus 409 transmit and receives data to and from devices on the same network or the Internet using a protocol such as a TCP/IP via a wireless LAN or a wired LAN that is compatible with a standard such as IEEE 80211a.

The management server 105 and the storage server 106 store the following programs on the hard disks 405. For example, the hard disk 405 of the management server 105 stores a program for creating an upload URL (Uniform Resource Locator) and a signed URL. The upload URL is used when the MFP 101 uploads a scanned file to the storage server 106. The signed URL is used by the portable terminal 104 when the storage server 106 accesses an uploaded scanned file. The hard disk 405 of the management server 105 stores a program for generating a two-dimensional bar code from a URL, and in the present embodiment, generates a two-dimensional bar code from a signed URL. In the present embodiment, a QR (Quick Response) code is described as an example of a two-dimensional bar code. The hard disk 405 of the storage server 106 stores, for example, a URL verification program that performs verification when the signed URL is accessed from an external unit. The hard disk 405 of the storage server 106 stores a scanned file that is scanned and uploaded by the MFP 101 and a log file on which an access log to a particular URL from an external unit is written.

In the present embodiment, the management server 105 and the storage server 106 are described as apparatuses that are different from each other, but may be configured as a single, integrated apparatus. Although each server is described as a single apparatus, each server may be configured by a plurality of apparatuses.

Next, the operation of the present system will be described. In this system, an access code for accessing the storage server 106 is displayed on the operation panel 303 of the MFP 101 after the scanned file obtained as a result of the reading of an original image by the MFP 101 is uploaded to the storage server 106. In the present embodiment, a QR code will be described as an example of an access code.

Figure 5:
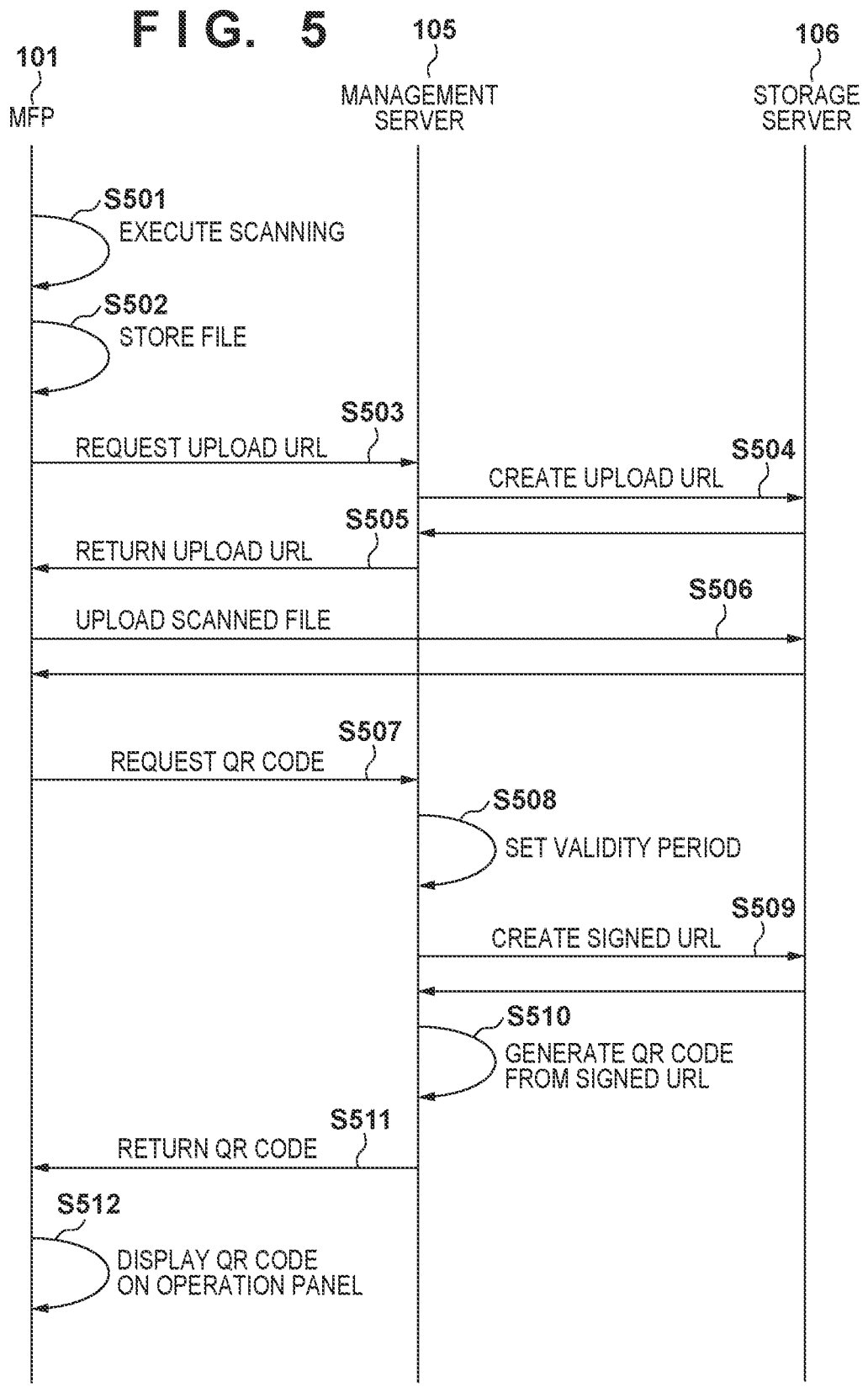
FIG. 5 is a sequence diagram for explaining the operation of the system.
Figure 14:
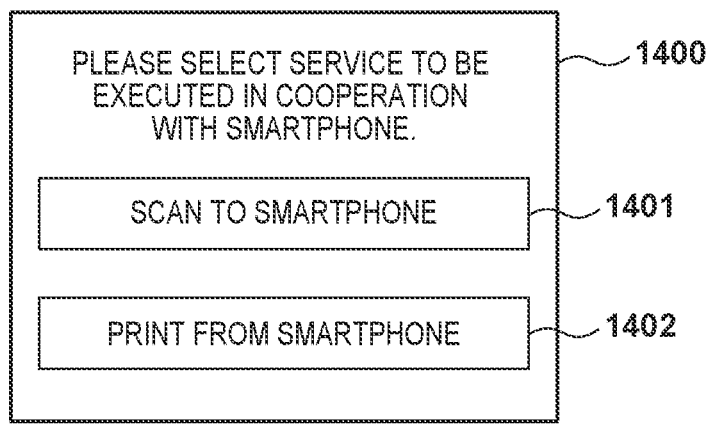
FIG. 14 is a diagram illustrating a service selection screen.

FIG. 5 is a sequence diagram for explaining the operation of the system. First, a service selection screen 1400 of FIG. 14 is displayed on the operation panel 303 of the MFP 101. In the service selection screen 1400, a list of services to be executed in cooperation with the portable terminal 104 is displayed. A scan service 1401 is a button for accepting a selection of a scan service function for transmitting a scanned file obtained by as a result of the reading of an original image by the MFP 101 to the portable terminal 104. A print service 1402 is a button for accepting a selection of a print service function that causes the MFP 101 to print image data in the portable terminal 104.

Figure 15:
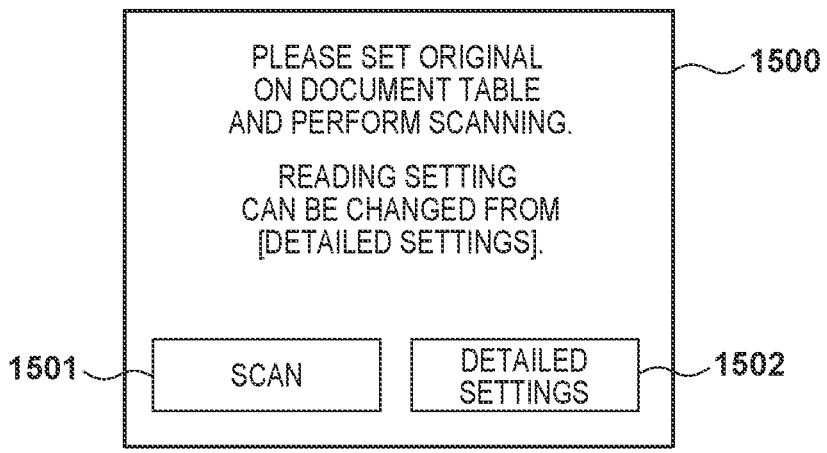
FIG. 15 is a diagram illustrating a screen for accepting scan execution.
Figure 16:
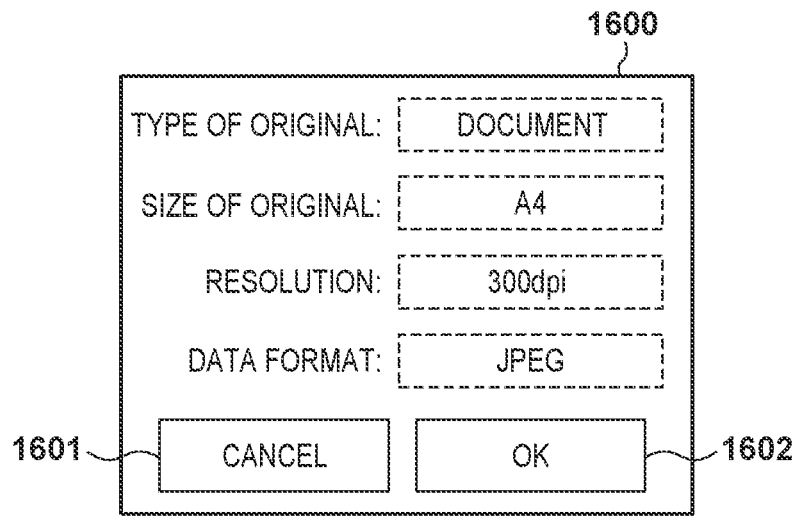
FIG. 16 is a diagram illustrating a detailed settings screen.

The MFP 101 accepts the selection of the scan service 1401 from the user on the service selection screen 1400. When the selection of the scan service 1401 is accepted, a screen 1500 for accepting the execution of the scan illustrated in FIG. 15 is displayed on the operation panel 303. When a scan button 1501 of the screen 1500 is pressed, an original image placed on a document table, for example, is read (step S501). A detailed settings button 1502 of the screen 1500 is a button for setting the reading of an original image. When the detailed settings button 1502 is pressed, a detailed settings screen 1600 of FIG. 16 is displayed on the operation panel 303. In the detailed settings screen 1600, items of the type and size of an original image such as a document or a photograph, reading resolution, and the data format of the scanned file, for example, are displayed so as to be changeable. For example, for the data format, file formats such as JPEG, PNG, and PDF are displayed so as to be selectable, Note that configuration may be taken so as to enable settings of the compression ratio of JPEG and PDF. When a cancel button 1601 is pressed, the changed setting contents are canceled and the screen is returned to the screen 1500. Also, when an OK button 1602 is pressed, the changed setting contents are confirmed and the screen is returned to the screen 1500.

When scanning is performed in step S501, the reading apparatus 306 starts reading an original image based on the setting contents of the detailed settings screen 1600, and stores the image data generated as a result of the reading on RAM 305 as a scanned file in the designated data format (step S502). The MFP 101 transmits a device-specific device name and serial number to the management server 105 and requests a URL (upload URL) which is an upload destination for the scanned file stored in step S502 (step S503).

When the management server 105 receives a request for an upload URL from the MFP 101, it issues a job ID corresponding to the reading in the MFP 101. Then, the management server 105 creates a unique folder hierarchy associated with the received device name and serial number on the storage server 106, and determines the upload URL (step S504). The management server 105 then sends the determined upload URL to the MFP 101 (step S505) and the MFP 101 uploads the scanned file stored in step S502 to the specified URL (step S506).

After the upload of the scanned file is completed, the MFP 101 sends the upload URL and the file name of the scanned file to the management server 105 and requests a QR code (step S507). The QR code is displayed on the operation panel 303 of the MFP 101 so as to be read by the portable terminal 104 when the portable terminal 104 accesses the scanned file uploaded to the storage server 106.

The management server 105 cross-references the file name of the scanned file in the specified upload URL with the file name obtained from the MFP 101 and begins creating the signed. URL. The signed URL is used in order for the client, the portable terminal 104, to be able to temporarily access directly to the storage server 106 without going through the management server 105. For example, an accessible period is set as a validity period for a signed URL.

The signed URL in the present embodiment will be described with reference to FIG. 10. A signed URL 1000 is configured to include elements 1001, 1002, 1003, 1004. The element 1001 is a communication protocol declaration and, for example, HTTPS (Hypertext Transfer Protocol Secure) is used as an encrypted communication protocol. The element 1002 indicates a host name and, for example, the storage server 106 is set. The element 1003 is hierarchical path information uniquely defined for each data, indicating the storage location of the data (scanned file) to be downloaded. The element 1003 further includes information indicating a device-specific device name, serial number, job ID, file name, and the like. The element 1004 is a query parameter of the URL and is authentication information (signature information) issued at the time of creation of the signed URL and, for example, a validity period is set. The validity period is information of a period in which the portable terminal 104 can download scanned files from the storage server 106. In the present embodiment, a unique hierarchical path including device-specific information is generated as the element 1003, but a hierarchical path may be generated by including different information so long as it is unique.

The management server 105 sets the validity period for creating the signed URL based on a validity period management table 1100 as illustrated in FIG. 11 (step S508). The validity period management table 1100 is stored in the hard disk 405 of the management server 105, and the validity period is set as the validity period in association with, for example, the file size, the number of files, and the communication line speed of the region where the download is performed. For example, the larger the file size and number of files, or the slower the communication line speed, the longer the validity period is set. In the present embodiment, as described above, it is possible to appropriately set the validity period set by the signed URL in accordance with the communication environment of the portable terminal 104 and the size of the file.

The management server 105, along with the set the validity period, requests the storage server 106 to create a signed URL (step S509). After that, the management server 105 starts a QR code generation program stored in the hard disk 405 of the management server 105, converts the created signed URL into a QR code (step S510), and transmits the QR code to the MFP 101 (step S511). The MFP 101 displays the QR code transmitted from the management server 105 on the operation panel 303 so that it can be read from an external unit (step S512). FIG. 13 illustrates a state in which the QR code is displayed, and a message prompting the user of the portable terminal 104 to read the QR code is displayed.

Thus, in the present embodiment, after the MFP 101 uploads the scanned file to the storage server 106, a signed URL indicating the upload destination is generated as a QR code. The generated QR code is displayed on the operation panel 303 of the MFP 101.

Subsequently, a sequence in which the user reads the QR code displayed on the operation panel 303 of the MFP 101 by the portable terminal 104 and downloads and stores the scanned file from the storage server 106 will be described with reference to FIG. 6.

The user starts a QR code reading program stored in the non-volatile memory 205 of the portable terminal 104 (step S601). The activation of the QR code reading program here is, for example, capturing of the QR code by the imaging apparatus 210 of the portable terminal 104 by the user. That is, in the present embodiment, the user does not need to install a dedicated application on the portable terminal 104 to obtain a signed URL.

After the activation of the QR code reading program, the portable terminal 104 captures and reads the QR code displayed on the operation panel 303 of the MIT 101 by the imaging apparatus 210 (step S602), and extracts a signed URL for download from the read data (step S603). The portable terminal 104, by the QR code reading program, starts a Web browser program stored in the non-volatile memory 205 (step S604). The portable terminal 104, by the started Web browser program, accesses the storage server 106 by specifying a signed URL (step S605).

The storage server 106 verifies whether or not additional information of the accessed signed URL is correct (step S606). Here, the additional information of the signed URL is, for example, encrypted token information, the above-described validity period, information of the file to be downloaded, and the like. If the additional information is the validity period, if the date and time when the access was received in step S605 is within the validity period, the additional information of the signed URL is determined to be correct. If in step S606 it is determined that the additional information of the signed URL is correct, the storage server 106 transmits the information of the file to be downloaded to the portable terminal 104 (step S607).

Figure 18A:
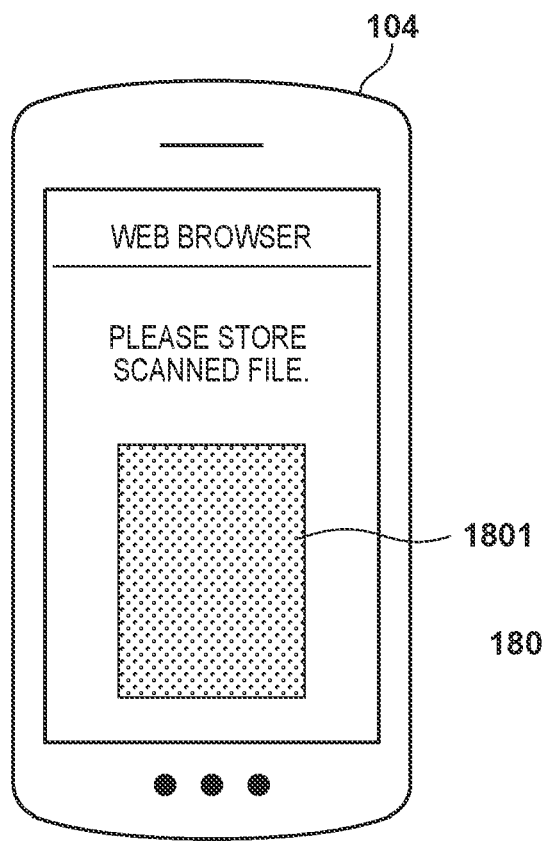
FIG. 18A and FIG. 18B are diagrams illustrating screens displayed on the portable terminal.

The portable terminal 104 displays the received file information on the display 206 by a Web browser (step S608). FIG. 18A illustrates an image 1801 of a scanned file displayed by a web browser. For example, the user, by a Web browser, selects the image 1801 displayed on the display 206, specifies a storage destination and stores the file (step S609), and displays the storage result (step S610). As the storage result, a message that saving of the scanned file is completed may be displayed, or a file display program such as a file viewer may be started to display the stored scanned file. The actual scanned file uploaded in step S506 may be downloaded to the portable terminal 104 in step S607 or may be downloaded when the storage destination is designated in step S609.

Figure 18B:
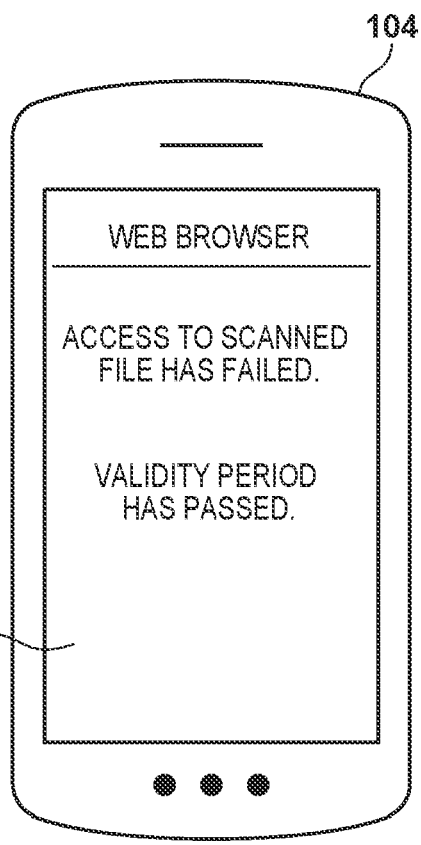

If in step S605 it is determined that the additional information is incorrect, such as when the date and time the access is received is past the validity period of the signed URL, the storage server 106 transmits the access error information to the portable terminal 104. In such a case, the portable terminal 104 displays the received access error information on the display 206 by a Web browser. FIG. 18B illustrates access error information 1802 displayed by a web browser.

As described above, in the present embodiment, the programs started by the portable terminal 104 for downloading and storing the scanned file is a QR code reading program and a Web browser. Therefore, there is no need to install a dedicated application or perform setup for communicating with the MFP 101, and the portable terminal 104 can download and store the scanned file with a simple configuration. Further, since the QR code to be read by the portable terminal 104 includes the information of the signed URL, security in the access can be maintained, and the user's operation procedure can be simplified.

Next, an operation from after the QR code is read by the portable terminal 104 until the QR code displayed on the operation panel 303 of the MFP 101 is erased at a timing when the uploaded scanned file is accessed will be described with reference to FIG. 7. The processes that are the same as in FIG. 6 are denoted by the same reference numerals, and description thereof is omitted.

The MFP 101 displays the QR code on the operation panel 303, and then starts a monitoring program for monitoring whether or not the upload destination of the scanned file uploaded to the storage server 106 is accessed from the portable terminal 104 (step S701). The access monitoring program of the MFP 101 monitors the updating of a log file of accesses a particular URL of the storage server 106. The storage server 106, when there is an access to the signed URL in step S605 and it is verified that the additional information for the signed URL is correct in step S606, adds and updates access information to the log file of accesses the signed URL (step S702). The access information is, for example, information on the access date and time. The storage server 106 notifies the MFP 101 that the access log file has been updated (step S703). The access monitoring program of the MFP 101 detects that the signed URL has been accessed by the notification of an update of the access log file, and deletes the QR code displayed on the operation panel 303 (step S704).

In this manner, the MFP 101 monitors whether or not the upload destination of the scanned file uploaded to the storage server 106 is accessed from the portable terminal 104. When the MFP 101 detects that there is an access, it deletes the QR code displayed on the operation panel 303. For example, if configuration is such that the access code is not displayed but outputted as a printed matter, the access code information, once it is outputted, may be transferred to a third party even after the access is detected. However, in the present embodiment, since the display of the access code is deleted when it is detected that there is an access, it is possible to reduce the possibility that the information of the access code may be transferred to a third party.

Figure 9:
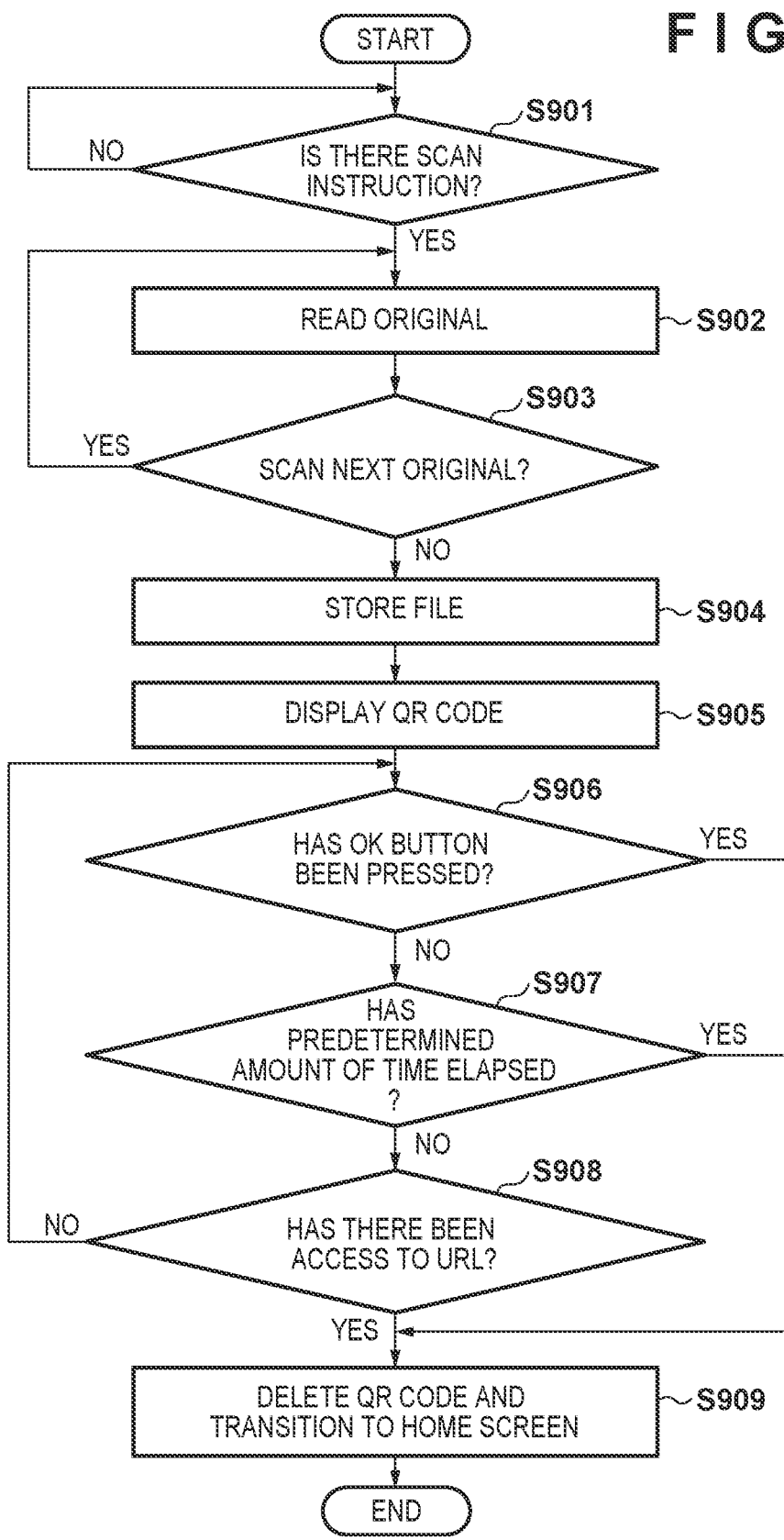
FIG. 9 is a flowchart illustrating a process performed when a scan instruction is received.

Next, a process performed when a scan instruction is received by the operation panel 303 of the MFP 101 will be described with reference to FIG. 9. The process of FIG. 9 is realized, for example, by the CPU 302 reading the program stored in the ROM 304 to the RAM 305 and executing it.

Figure 17:
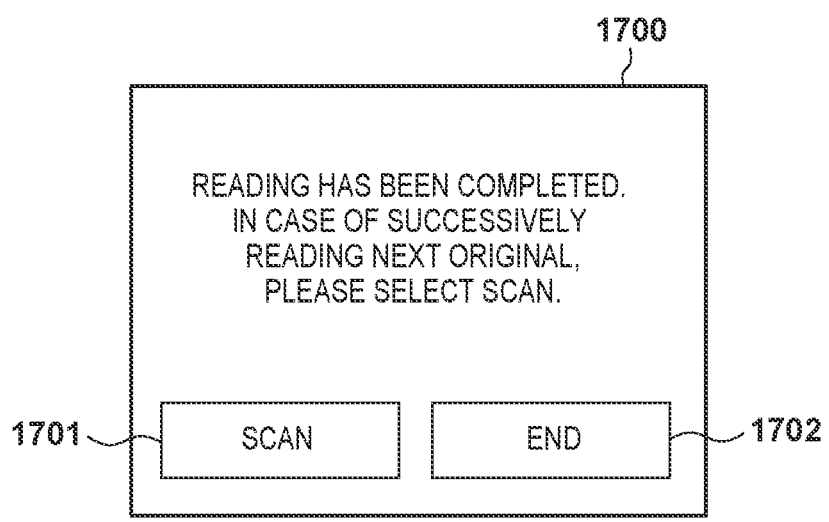
FIG. 17 is a diagram illustrating an original confirmation screen.

On the screen 1500 of FIG. 15 displayed on the operation panel 303 of the MFP 101, the CPU 302 waits for an event of a press of the scan button 1501 (step S901). Upon receiving the pressing of the scan button 1501 (YES in step S901), the CPU 302 reads an original image placed on a document table or ADF (not shown) (step S902). After the scanning is completed, the CPU 302 displays an original confirmation screen 1700 of FIG. 17 in order to make the user confirm whether or not to successively read the next original image. If the user is to perform successively reading of the next original, the user presses a scan button 1701. When the press of the scan button 1701 is accepted, the CPU 302 repeats the process from step S902 (Yes in step S903). On the other hand, when all of the originals have been read, the user presses an end button 1702. When the press of the end button 1702 is accepted (No in step S903), the CPU 302 stores the image data generated as a result of the reading as a scanned file (step S904). For example, the image data obtained by reading a plurality of original images is stored as a single scanned file. For example, when a setting of "multi-page PDF" is accepted in the data format item of the detailed settings screen 1600 of FIG. 16, it may be stored as a single scanned file.

Step S901 to step S903 correspond to step S501 of FIG. 5 and step S904 corresponds to step S502 of FIG. 5.

The CPU 302 displays a QR code for accessing the scanned file uploaded to the storage server 106 on the operation panel 303 so that it can be read from an external unit (step S905). As illustrated in FIG. 13, the display 1300 displays an OK button 1303 for the user to respond to the message. When the press of the OK button 1303 is accepted as a user operation (Yes in step S906), the CPU 302 deletes a QR code 1301 and transitions to a home screen (not shown) (step S909). Further, when a predetermined amount of time elapses in a state in which the OK button 1303 is not pressed (No in step S906, Yes in step S907), the CPU 302 erases the QR code 1301, and transitions to the home screen (not shown) (step S909). Note that a message indicating that the QR code is to be erased after the predetermined amount of time has elapsed may be displayed on the operation panel 303, or a timer unit for counting down until the QR code is erased may be displayed.

If the predetermined amount of time has not elapsed in step S907, the CPU 302 determines whether or not an access from the portable terminal 104 to the signed URL included in the QR code has been detected. Here, when it is detected that the signed URL has been accessed from the portable terminal 104 (Yes in step S908), the CPU 302 deletes the QR code 1301 and transitions to the home screen (not shown) (step S909). On the other hand, if it is not detected that the signed URL has been accessed from the portable terminal 104, the process from step S906 is repeated.

Figure 7:
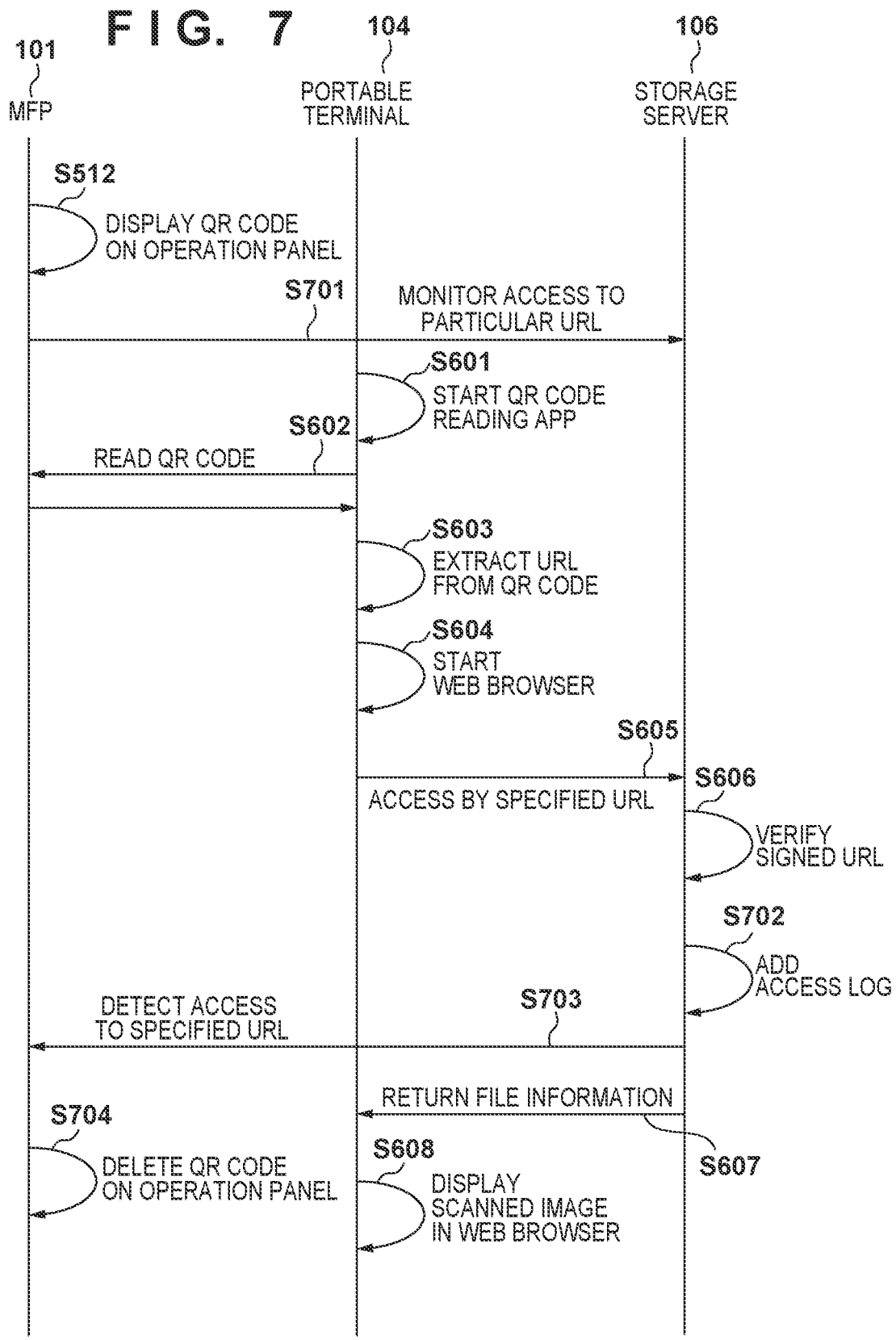
FIG. 7 is a sequence diagram for explaining the operation up until a displayed QR code is deleted.

Step S905 corresponds to step S512 of FIG. 5 and step S908 to step S909 corresponds to step S703 to step S704 of FIG. 7.

As described above, in the present embodiment, when a predetermined condition is satisfied in a state in which the QR code is displayed on the operation panel 303 of the MFP 101, the displayed QR code is deleted. For example, when the OK button 1303 is pressed, or when a predetermined amount of time has elapsed after the QR code is displayed, the QR code is deleted. Such display control can further reduce the possibility that unauthorized access may be performed to the storage server 106 due to access code information being transferred to a third party.

As described above, according to the present embodiment, the access code for downloading the scanned file from the storage server 106 is displayed on the operation panel 303 of the MFP 101. The portable terminal 104 can download and store via a Web browser by reading the displayed access code. When a predetermined condition is satisfied, such as when the storage server 106 is accessed from the portable terminal 104, the access code displayed on the MFP 101 is deleted. As a result, it is possible to reduce the possibility of unauthorized access to the scanned file due to the information of the access code being transferred to a third party. Incidentally, in the present embodiment, a QR code (two-dimensional bar code) has been described as an example of the access code. However, if the access code can be read by the imaging apparatus 210 of the portable terminal 104, the access code may be realized by another configuration such as a one-dimensional bar code.

Second Embodiment

Hereinafter, a second embodiment will be described with regard to points different from the first embodiment. In the first embodiment, a QR code has been described as an example of an access code for accessing a scanned file uploaded to the storage server 106. Here, there may be a limit to the storage capacity of an access code such as a QR code. In the present embodiment, a configuration in which a shortened URL is used as an access code will be described. In the present embodiment, even if the capacity of an access code is limited due to such a configuration, the effects of the limitation can be avoided.

In the present embodiment, the hard disk 405 of the management server 105 stores a shortened URL creation program for creating a shortened URL from a signed URL. The hard disk 405 of the management server 105 stores a redirect program that transmits a signed URL to the portable terminal 104 when a shortened URL is accessed from the portable terminal 104.

The operation of a system of the present embodiment will be described. After the scanned file is uploaded from the MFP 101 to the storage server 106, the portable terminal 104 reads the QR code displayed on the MFP 101 and displays it on the display 206 by a web browser.

Figure 8:
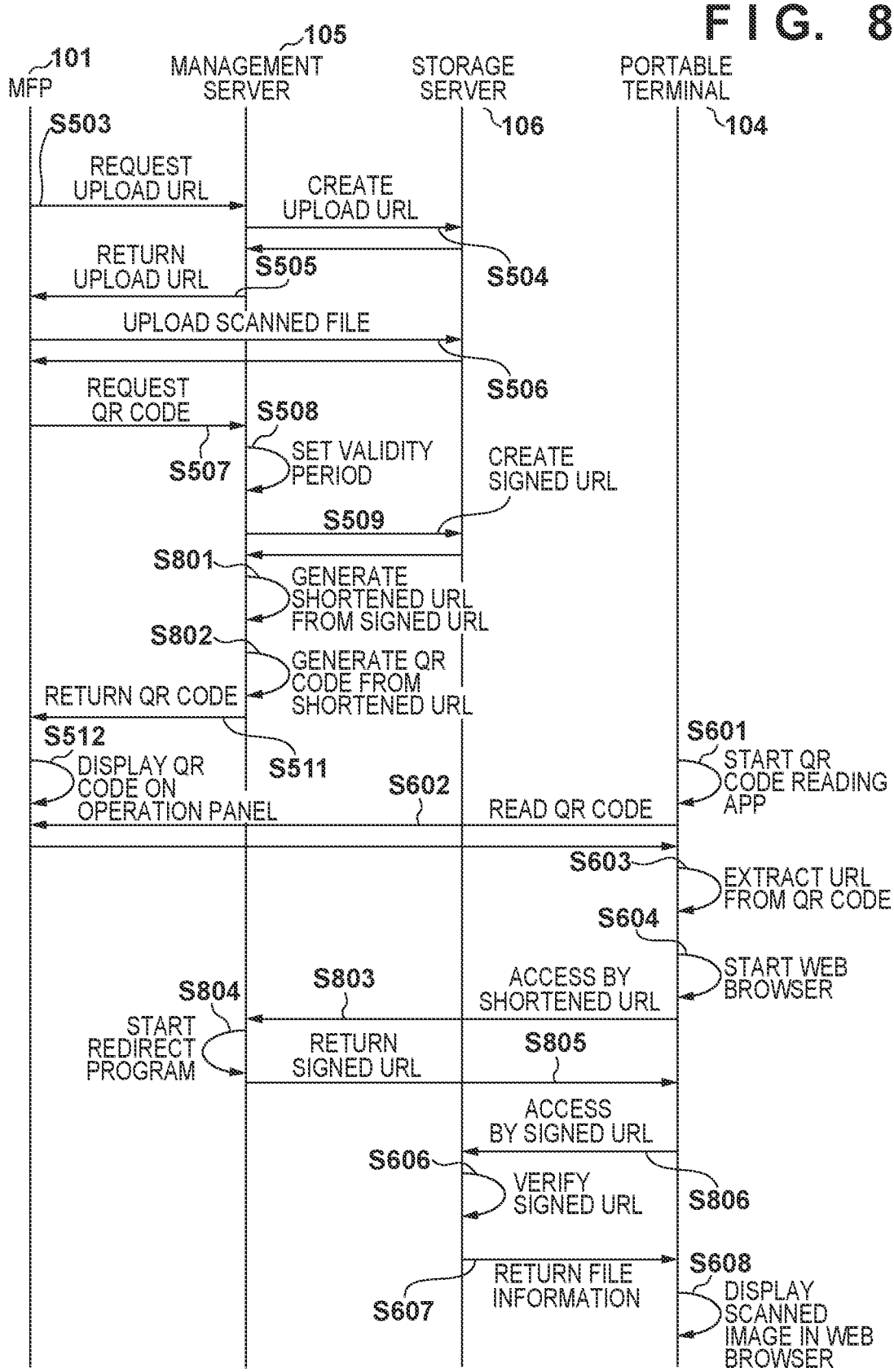
FIG. 8 is a sequence diagram for explaining the operation of a scanning system.

FIG. 8 is a sequence diagram for explaining the operation of the system in the present embodiment. The processes that are the same as in FIGS. 5 and 6 are denoted by the same reference numerals.

Similarly to the case of FIG. 5, when the management server 105 receives the upload URL request of the scanned file from the MFP 101, it transmits the upload URL to the MFP 101 (step S503 to step S505). After uploading the scanned file (step S506), the MFP 101 requests the management server 105 for the QR code to be displayed on the operation panel 303 (step S507). After creating the signed URL (step S508 and step S509), the management server 105 starts the shortened URL creation program and creates a shortened URL from the signed URL (step S801).

FIG. 12 is a diagram illustrating an example of a shortened URL management table 1200 for creating a shortened URL from a signed URL. The shortened URL management table 1200 is stored, for example, in the hard disk 405 of the management server 105. For example, the shortened URL may be created using a character string having a fixed size such as a device name or a serial number included in the signed URL as is. In addition, the shortened URL may be created using a variable-size character string such as the additional information of the signed URL as a random shortened character string. A character string of the entire signed URL may also be created as a random shortened character string. After creating the shortened URL (step S801), the management server 105 starts the QR code generation program, converts the shortened URL to a QR code (step S802), and transmits the converted QR code to the MFP 101 (step S511).

Figure 6:
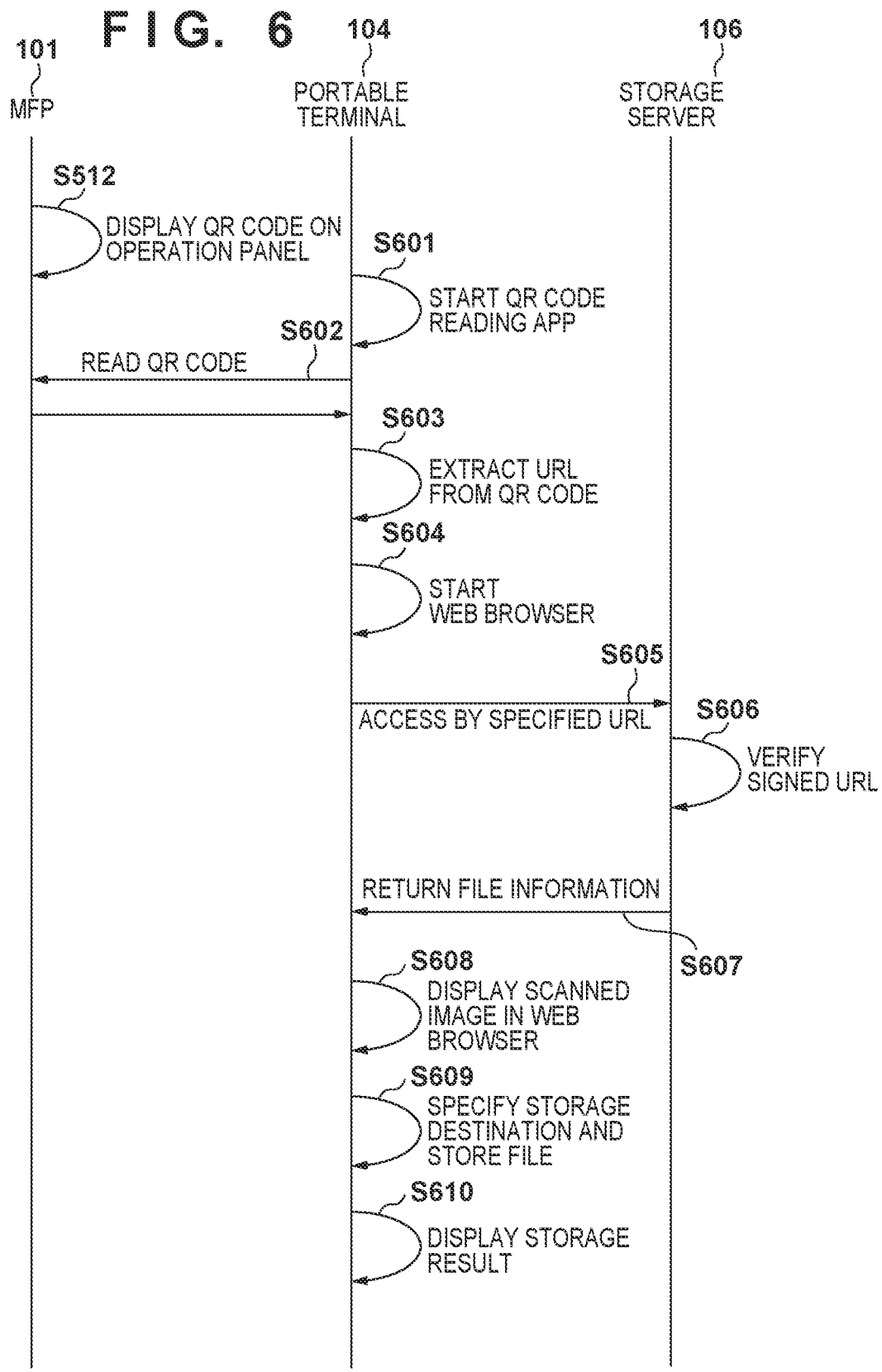
FIG. 6 is a sequence diagram for explaining the operation up until a scanned file is obtained.

Similarly to FIG. 6, the user starts the QR code reading program of the portable terminal 104, reads the QR code displayed on the operation panel 303 in step S512 by capturing the QR code, and extracts the shortened URL from the read data (step S601 to step S603). That is, in the present embodiment, unlike the first embodiment, a shortened URL is extracted from the read data instead of a signed URL. The portable terminal 104 starts the Web browser program by the QR code reading program (step S604), and accesses the management server 105 by specifying the shortened URL (step S803).

The management server 105 starts a redirect program (step S804), refers to the shortened URL management table 1200, and transmits a signed URL for downloading the scanned file to the portable terminal 104 as the redirect destination (step S805). The portable terminal 104, by the Web browser program, accesses the storage server 106 by specifying a signed URL (step S806). The storage server 106 verifies whether or not additional information of the signed URL is correct (step S606). If in step S606 it is determined that the additional information of the signed URL is correct, the storage server 106 transmits the information of the file to be downloaded to the portable terminal 104 (step S607). The portable terminal 104 displays the received file information on the display 206 by a Web browser (step S608). At this time, as illustrated in FIG. 18A, the image 1801 of the scanned file is displayed.

As described above, according to the present embodiment, in the process of generating and displaying an access code for downloading the scanned file from the storage server 106, even if there were limitation to the capacity of the access code, it is possible to avoid the effect of such limitation.

The present invention is not limited to the above embodiments and various changes and modifications can be made within the spirit and scope of the present invention. Therefore, to apprise the public of the scope of the present invention, the following claims are made.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-150737, filed Sep. 8, 2020, which is hereby incorporated by reference herein in its entirety.

What is claimed is:

1. A system including a reading apparatus, a server, and a portable terminal,
the reading apparatus comprising:
a scanner for reading an original image,
a display unit, and
at least one processor for executing instructions causing the reading apparatus to:
upload to the server a scanned file including image data obtained by scanning an original image by the scanner; and
display, on the display unit, an access code which is for accessing an upload destination of the scanned file;
the portable terminal comprising:
a camera, and
at least one processor for executing instructions causing the portable terminal to:
obtain information indicating an upload destination of the scanned file based on the reading of the access code by the camera;
access, using the obtained information, the upload destination of the scanned file; and
download the scanned file from the upload destination of the scanned file,
wherein the information indicating the upload destination of the scanned file includes authentication information related to an access of the upload destination of the scanned file, and
wherein, in a case where a condition is satisfied, the displayed access code on the display unit is deleted.

2. The system according to claim 1, wherein the reading apparatus further generates, as the access code, a code that includes information indicating the upload destination of the scanned file.

3. The system according to claim 1, wherein the information indicating the upload destination of the scanned file is a signed URL (Uniform Resource Locator).

4. The system according to claim 1, wherein the authentication information includes a validity period.

5. The system according to claim 4, wherein a second server different from the server sets the validity period.

6. The system according to claim 1, wherein the generation unit and the setting unit are comprised in a second server different from the server generates the access code.

7. The system according to claim 6, wherein the second server generates the access code that includes a shortened URL (Uniform Resource Locator) corresponding to a signed URL as the information indicating the upload destination of the scanned file.

8. The system according to claim 7, wherein the portable terminal accesses the upload destination of the scanned file using the signed URL obtained from the second server based on the shortened URL included in the access code.

9. The system according to claim 3, wherein the portable terminal downloads the scanned file from the upload destination of the scanned file based on a result of a verification of an access of the signed URL.

10. The system according to claim 1, wherein the condition includes accepting a user operation via the display unit.

11. The system according to claim 10, wherein
a message prompting to read the displayed access code is displayed with the access code on the display unit.

12. The system according to claim 1, wherein the condition includes that a predetermined amount of time has elapsed from when the access code was displayed.

13. The system according to claim 1, wherein the access code is a two-dimensional barcode.

14. A reading apparatus capable of communicating with a server, the reading apparatus comprising:

a scanner for reading an original image,
a display unit, and
at least one processor for executing instructions causing the reading apparatus to:
upload to the server a scanned file including image data obtained by scanning an original image by the scanner; and
display, on the display unit, an access code which is for accessing an upload destination of the scanned file,
wherein the information indicating the upload destination of the scanned file includes authentication information related to an access to the upload destination of the scanned file, and
wherein, in a case where a condition is satisfied, the access code displayed on the display unit is deleted.

15. The reading apparatus according to claim 14, wherein the condition includes accepting a user operation via the display unit.

16. The reading apparatus according to claim 15, wherein a message prompting to read the displayed access code is displayed with the access code on the display unit.

17. The reading apparatus according to claim 14, wherein the condition includes that a predetermined amount of time has elapsed from when the access code was displayed.

18. A method for system including a reading apparatus, a server and a portable terminal, wherein the method comprising,
uploading, from the reading apparatus to the server, a scanned file including image data obtained by scanning an original image using a scanner of the reading apparatus; and
displaying, on a display unit of the reading apparatus, an access code which is for accessing an upload destination of the scanned file;
obtaining information indicating an upload destination of the scanned file based on the reading of the access code by a camera of the portable terminal;
accessing, by the portable terminal and using the obtained information, the upload destination of the scanned file; and
downloading, by the portable terminal, the scanned file from the upload destination of the scanned file,
wherein the information indicating the upload destination of the scanned file includes authentication information related to an access of the upload destination of the scanned file, and
wherein, in a case where a condition is satisfied, the displayed access code on the display unit is deleted.

19. A system including a reading apparatus, a first server, a second server different from the first server, and a portable terminal,
the reading apparatus comprising,
a scanner for reading an original image,
a display unit, and
at least one processor executing instructions causing the reading apparatus to:
upload to the first server a scanned file including image data obtained by scanning an original image using the scanner; and
display, on the display unit, an access code which is for accessing an upload destination of the scanned file;
the portable terminal comprising,
a camera, and
at least one processor executing instructions causing the portable terminal to:
obtain information indicating an upload destination of the scanned file based on the reading of the access code by the camera;
access, using the obtained information, the upload destination of the scanned file; and
download the scanned file from the upload destination of the scanned file;
wherein the information indicating the upload destination includes authentication information related to an access of the upload destination of the scanned file, and
wherein the authentication information includes a validity period set by the second server.

20. A method for system including a reading apparatus, a first server, a second server different from the first server, and a portable terminal,
the method comprising,
uploading, from the reading apparatus to the first server, a scanned file including image data obtained by scanning an original image using a scanner of the reading apparatus; and
displaying, on a display unit of the reading apparatus, an access code which is for accessing an upload destination of the scanned file;
obtaining information indicating an upload destination of the scanned file based on the reading of the access code by a camera of the portable terminal;
accessing, by the portable terminal and using the obtained information, the upload destination of the scanned file; and
downloading, by the portable terminal, the scanned file from the upload destination of the scanned file,
wherein the information indicating the upload destination of the scanned file includes authentication information related to an access of the upload destination of the scanned file, and
wherein the authentication information includes a validity period set by the second server.

* * * * *